6828X
O. Tufts. Sheet 1. 2 Sheets.
Hand Printing Press.
No. Patented Nov. 7. 1831.
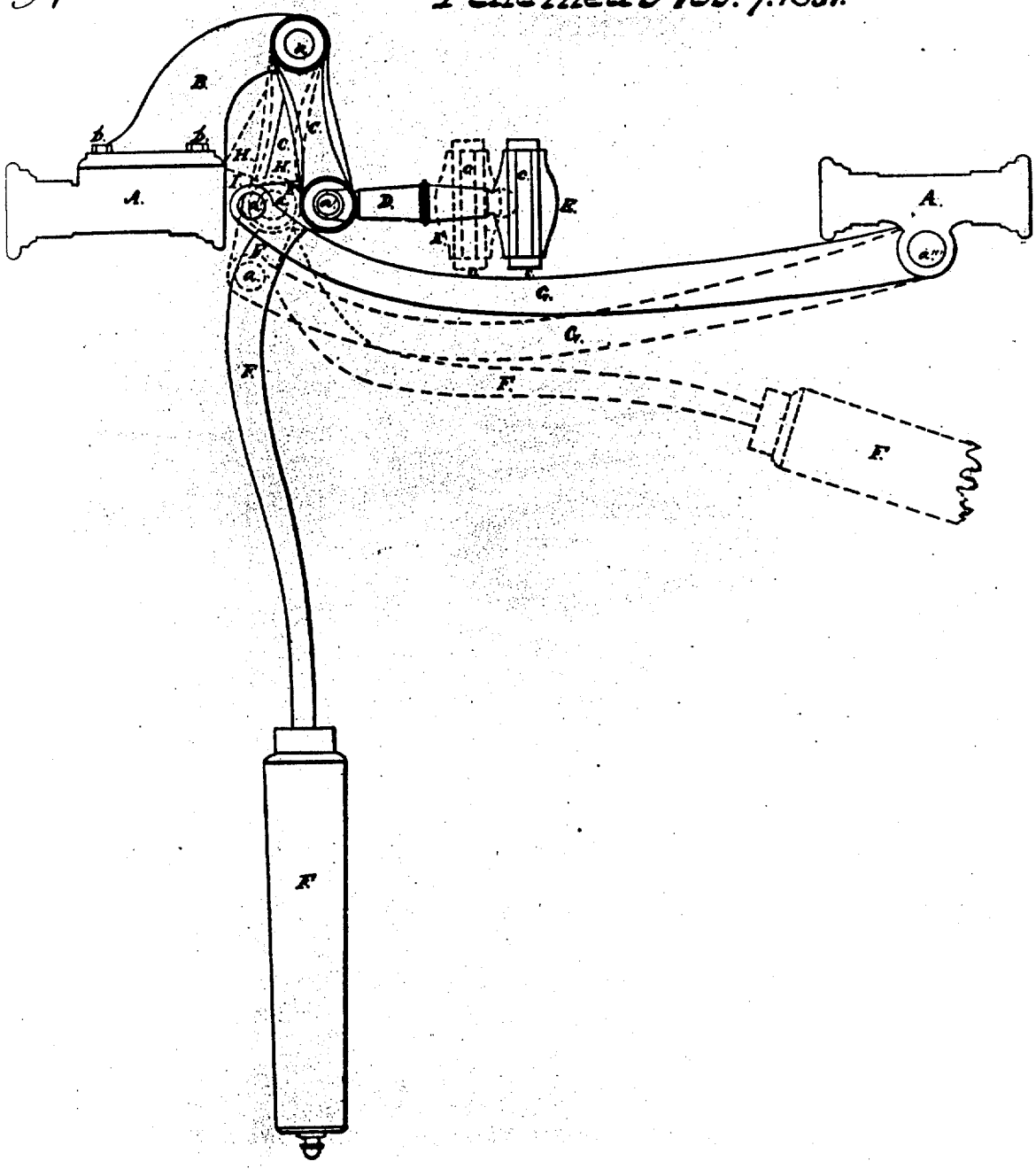

6828X
O. Tufts. Sheet 2. 2 Sheets.
Hand Printing Press.
No. Patented Nov. 1831.
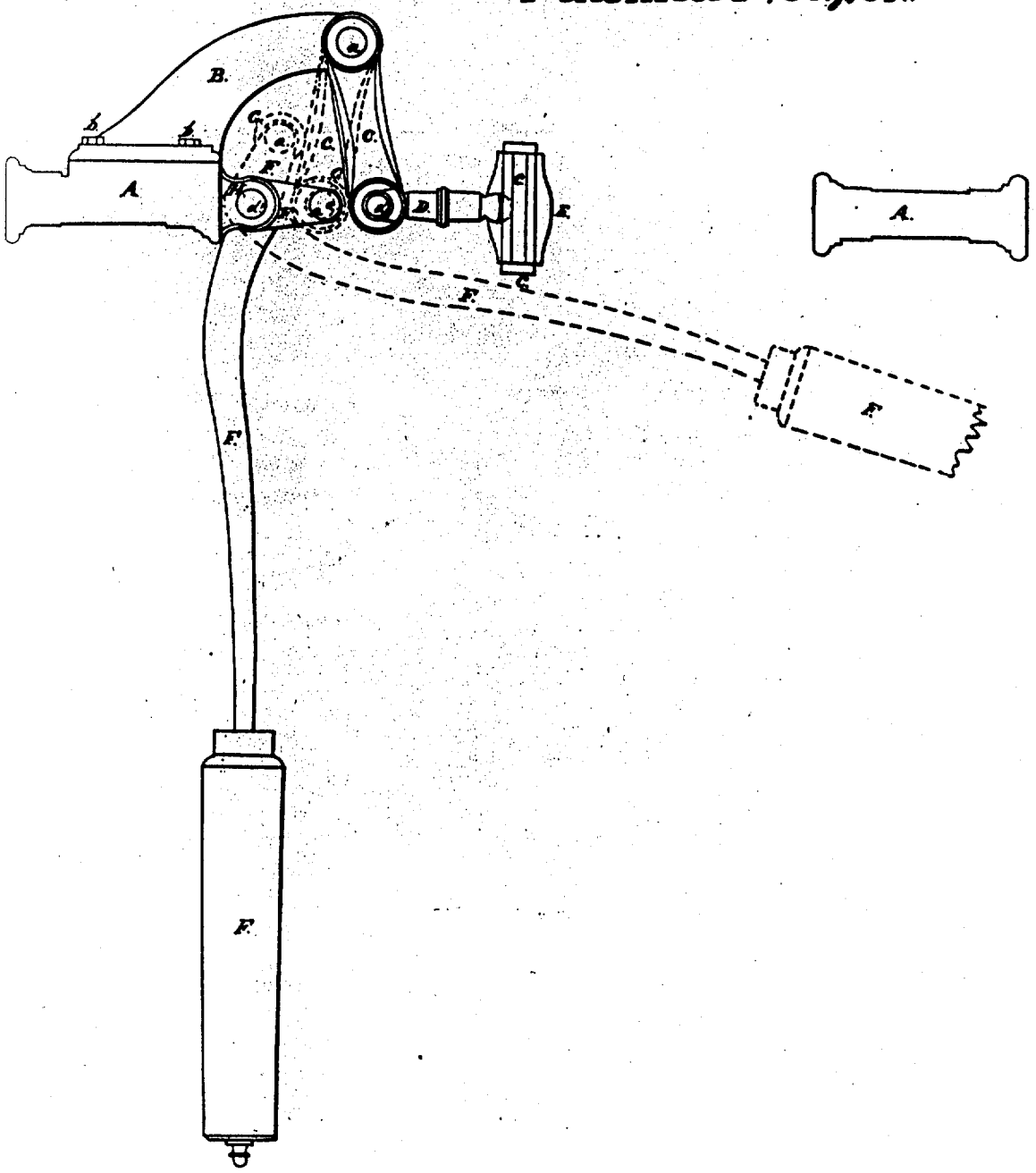

X0006828. Nov 7, 1831

Otis Tufts

The Schedule referred to in these Letters Patent and mak-
ing part of the same containing a description in the words
of the said Otis Tufts himself of his improvement
in the manner of straightening the toggle joints in the
hand printing press. To all persons to whom these
presents shall come Otis Tufts of Boston in the
County of Suffolk and State of Massachusetts Machin-
ist sends greeting. Be it known that I the said
Otis Tufts have invented constructed made and applied
to use new and useful improvements in the manner of pre-
ing up or straightening the toggle joints in the hand printing
press which improvements are described in the follow-
ing words and annexed drawings which taken togeth-
er form my specification. First. I attach to the back
of the arch of the press by screws or otherwise an arm
B of the form represented in the drawing or it may be
made in any other convenient shape as the fancy or
taste of the workman may direct. To this I connect
a link C. which turns on a pin or bolt a passing
through the link an end of the arm B. In the other
extremity of this link I place one end of a bent lever or
handle F. which swivels or turns to the right or left on
a pin passing through it and the link as shown at a,
At a point I in this lever or bar G of iron or other met-
al forked or split open so as to admit the lever to pass
through it is connected by a similar circular pin or
bolt to them as above described. The opposite extremity
of this bar moving on a pin a''' between two ears or project-
ions on either side of the arch of the press towards the operator
D is the pitman one end being cut out in a semicircular
form and resting against the bolt or pin a' the other hav-
ing a ball turned on it to fit in a socket in the
lever lower toggle E, when the lever is pulled by the pressman, the end of the bar G is carried inwards towards the arch and serves as a moving fulcrum for the lever. the end of the lever to which the pitman is attached being kept in a curve differing but very little from a right line during its motion. by its connection with the link. The pitman is driven forward in nearly a straight direction and throughout the full acts without much variation perpendicular to the toggles. Secondly the arm B. the link C. the pitman D and the toggles E. plan, no 2. remaining in precisely the same position with respect to each other as aforementioned. I place a part L of the lever between two ears or projections H. on the inside of the arch. and secure it by a pin or bolt a. on which it is allowed to turn. In the end of the lever I fix a roller G. which acts on a plane or curved surface formed on the side of the link. By pulling the lever the friction roller pushes forward the link which communicates its motion to the pitman which resting against the toggles thus straightens the joints. What I claim as my invention and what I consider as new, is the application of the bar G, to the other parts of the combination to produce the effect of straightening the toggle joints in the hand printing press, also I claim the fixing of a roller in the end of the lever to act against a plane or curved surface on the side of a link C. moving in a centre a, for the purposes aforesaid. The red lines in both drawings represent the positions of the different parts when the press is not in use and are designated by red letters which correspond with those in black. In testimony that the above is a true specification of my invention. I have hereunto affixed my hand and seal this 8th day of July in the year of our Lord eighteen hundred and thirty one Witnesses Robert H. Eddy
[illegible] C. Pitters Otis Tufts Ex^d [illegible]